(12) United States Patent
Nishimura et al.

(10) Patent No.: US 6,445,989 B2
(45) Date of Patent: Sep. 3, 2002

(54) VEHICLE CONTROL APPARATUS HAVING MULTIPLE ECUS LOADED WITH RESPECTIVE CONTROL PROGRAMS

(75) Inventors: Tadaharu Nishimura, Obu; Akihito Iwai, Chiryu, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/814,102

(22) Filed: Mar. 22, 2001

(30) Foreign Application Priority Data

Mar. 24, 2000 (JP) ....................................... 2000-084121

(51) Int. Cl.$^7$ ................................................. G06F 7/00
(52) U.S. Cl. ........................................... 701/48; 701/33
(58) Field of Search .............................. 701/48, 36, 33, 701/102, 53

(56) References Cited

U.S. PATENT DOCUMENTS 5,490,064 A 2/1996 Minowa et al. ......... 364/424.01
6,236,910 B1 * 5/2001 Iwai et al. ..................... 701/1

FOREIGN PATENT DOCUMENTS

EP 0 987 424 3/2000

* cited by examiner

*Primary Examiner*—Yonel Beaulieu
(74) *Attorney, Agent, or Firm*—Nixon & Vanderhye P.C.

(57) ABSTRACT

A vehicle control apparatus has multiple electronic control units, A-ECU and B-ECU, connected via a communication line. Control programs of the apparatus is defined in an object-oriented type and loaded distributedly among multiple control units. The control programs of each control unit includes an application layer, an interface layer, a hardware-dependent virtual sensor part, a virtual actuator part, an input information converting part and output control part. The application layer is separated from hardware-dependent parts When an application layer of a B-ECU specifies a virtual actuator part and outputs driving information, an interface layer sends the driving information via the communication line to an interface layer of an A-ECU. The output control part of the A-ECU outputs that driving information at suitable timing to the virtual actuator part.

10 Claims, 7 Drawing Sheets

VEHICLE CONTROL APPARATUS HAVING MULTIPLE ECUS LOADED WITH RESPECTIVE CONTROL PROGRAMS

CROSS REFERENCE TO RELATED APPLICATION

This application is based on and incorporates herein by reference Japanese Patent Application No. 2000-84121 filed Mar. 24, 2000.

BACKGROUND OF THE INVENTION

This invention relates to a vehicle control apparatus, which is capable of reusing control programs and reducing processing timing delay in distributed processing.

Vehicle control apparatuses control a vehicle by executing programmed computation processing based on vehicle information from sensors and outputting driving information to actuators in accordance with results of the computation processing. This vehicle control is realized by executing vehicle control programs. These vehicle control programs has been contrived so that application programs may be reused.

In one proposal, an ECU is loaded with a program which is divided, as shown in FIG. 7, into an application layer 610, an interface layer 620, and a hardware layer 700. Each layer is a unit of programs. The application layer 610 is made up of processing programs for executing the computation processing. The hardware layer 700 has a virtual sensor part 630 made up of processing programs for acquiring vehicle information detected by sensors, a virtual actuator part 640 made up of processing programs for outputting driving information to actuators, and a communication driver 650 which is a processing program for executing communication with other ECUs. By separating the hardware layer (processing programs dependent on hardware) 700, which might change with vehicle type or grade or the like, from the application layer 610, the application layer 610 can be used as it is and the application programs can be reused, even if the hardware is changed.

In practice, multiple ECUs (for instance, A-ECU and B-ECU) are connected via a communication line 500 as shown in FIG. 8 for distributed processing. In FIG. 8, it is assumed that an actuator driven by the virtual actuator part 640a of the A-ECU is controlled with computation results of the application layer 610b of the B-ECU.

At this time, because the interface layer 620b of the B-ECU manages the whereabouts of the processing program that is the output destination of the driving information, the application layer 610b of the B-ECU does not need the information of where the processing program to which the driving information should be outputted is. That is, position freedom or transparency is realized by the interface layer 620b.

Specifically, the interface layer 620b determines an output destination specified from the application layer 610b of the B-ECU, and via the communication driver 650b sends the driving information to the A-ECU. That is, the driving information is transferred in the order of B-ECU communication driver 650b→communication line 500→A-ECU communication driver 650a→A-ECU interface layer 620a→A-ECU virtual actuator part 640a. Thus, in the application layer 610b of the B-ECU, even if the processing program for driving the hardware that is the subject of control exists as a processing program in a different ECU, there is no need whatsoever for that to be considered. Consequently, distributed processing among multiple ECUs can be realized easily. Here it is to be noted that 'the application does . . . ' means that by a CPU of the ECU executing a processing program constructed as an application layer a function of the application layer is exhibited. However, for brevity, expressions having the processing program as the subject will be suitably used.

When the above program construction is employed in control of an engine, a drive train and the like, relatively high real-time operation is required. However, there maybe cases in which the distributed processing cannot be realized. For example, in FIG. 8, there is a possibility of driving information from the application layer 610b of the B-ECU not being transferred to the virtual actuator part 640a of the A-ECU in real time. It is assumed here that an injection system wherein an injector is driven by the virtual actuator part 640a of the A-ECU and the injector is controlled by the application layer 610b of the B-ECU. In this case, it is necessary for an injection command from the application layer 610b of the B-ECU to be sent to the virtual actuator part 640a of the A-ECU in real time. However, when the communication line 500 is being used for other communication, the transfer of driving information is delayed.

This will also happen in inputting of vehicle information from the various sensors. The vehicle information acquired by the virtual sensor part 630 shown in FIG. 7 is sampled and averaged by the application layer 610 at intervals of for example 1 ms. However, if distributed processing is tried, because communication processing via the communication line 500 is carried out, the application layer 610b of the B-ECU cannot sample vehicle information acquired by the virtual sensor part 630a of the A-ECU at intervals of 1 ms.

SUMMARY OF THE INVENTION

The present invention has an object of making possible distributed processing even in control which requires relatively high real-time operation, while ensuring reusability of application programs constituting vehicle control programs.

According to the present invention, a vehicle control apparatus has multiple control units which are loaded with vehicle control programs distributedly. The vehicle control program in each control unit includes an application layer for executing the computation processing, and a sensor/actuator layer for executing processing of vehicle information from sensors and driving information for actuators.

The vehicle control program further includes an interface layer for acquiring and sending to another control unit the driving information from the application layer and also acquiring the driving information sent from the another control unit. It also includes an information control layer for outputting to the sensor/actuator layer at suitable timing the driving information acquired by the interface layer. Preferably, the application layer outputs the driving information in a fixed form, and the information control layer converts to information directly processable by the sensor/actuator layer and outputs the driving information.

Alternatively, the vehicle control program further includes an information control layer for at suitable timing acquiring and outputting the vehicle information acquired by the sensor/actuator layer. It further includes an interface layer for acquiring and outputting to the application layer the vehicle information outputted from the information control layer on the basis of a request from the application layer, making a request for the vehicle information to another control unit acquiring and outputting to the application layer the vehicle information sent with respect to this request, and sending the vehicle information from the information control layer when a request is made for the vehicle information from another control unit. Preferably, the sensor/actuator layer outputs the vehicle information in a form corresponding to the sensors, and the information control layer converts to information directly processable by the application layer and outputs the vehicle information.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT

Figure 1:
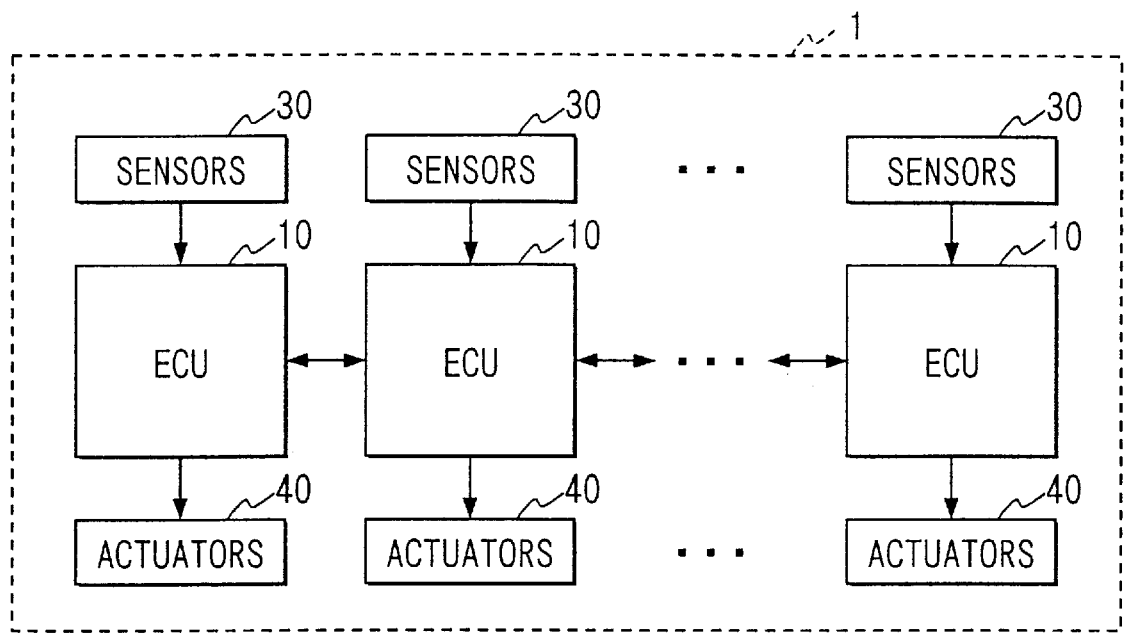
FIG. 1 is a block diagram showing a construction of a vehicle control apparatus according to an embodiment of the present invention.

Referring to FIG. 1, a vehicle control apparatus 1 has multiple electronic control units (ECUs) 10, so that different parts of a vehicle are controlled by these multiple ECUs 10. To each of the ECUs 10, various sensors 30 which detect states of the vehicle as vehicle information are connected, and various actuators 40 which drive different parts of the vehicle in response to driving information from the ECUs 10 are connected. The ECUs 10 form an in-vehicle network having a protocol such as CAN to communicate with each other.

For example, if the ECU 10 is for carrying out control of an engine, the sensors 30 are for detecting the running state of the engine. The sensors 30 include a rotation sensor for generating a pulse-shaped signal every time a crankshaft of the engine rotates a predetermined angle, a reference position sensor for generating a pulse-shaped signal every time the piston of a specified cylinder of the engine reaches a predetermined position (for example top deadcenter: TDC), a coolant temperature sensor for detecting the temperature of cooling water of the engine, an intake pipe pressure sensor for detecting the pressure of an intake pipe of the engine, and an oxygen concentration sensor for measuring an oxygen concentration in exhaust emissions. The actuators 40 include are injectors (fuel injection devices) and igniters (igniting devices) mounted on the engine.

Figure 2:
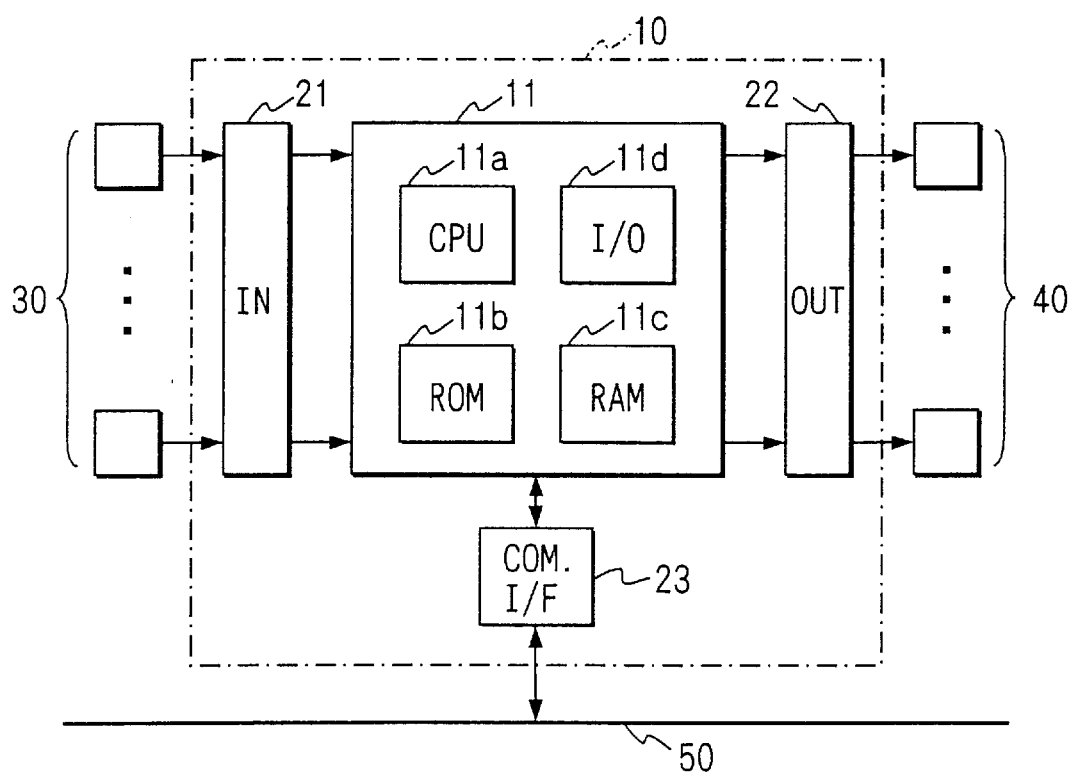
FIG. 2 is a block diagram showing a hardware construction of an ECU used in the embodiment.

As shown in FIG. 2, each ECU 10 has an input circuit 21 for inputting signals from the sensors 30 and carrying out waveform shaping and A/D-conversion, a microcomputer 11 for carrying out various processing for controlling the vehicle on the basis of vehicle information from the input circuit 21, an output circuit 22 for driving the actuators 40 in accordance with driving information from the microcomputer 11, and a communication interface (I/F) 23 for carrying out communication with other ECUS 10 by way of a communication line 50. This communication line 50 connects the ECUs 10 to each other to form the in-vehicle network.

The microcomputer 11 has an central processing unit (CPU) 11a for executing programs, a ROM 11b storing programs to be executed by the CPU 11a and control data to be referred to during the execution of these programs, a RAM 11c for temporarily storing computation results obtained by the CPU 11a, and an input/output circuit (I/O) lid for exchanging signals with the input circuit 21, the output circuit 22 and the communication I/F 23. The microcomputer 11 also includes various registers, free-run counters and other circuits (not shown).

Vehicle control programs loaded into the vehicle control apparatus 1 are held distributed among the ROMs 11b of the microcomputers 11 of the ECUs 10. By the CPU 11a executing the program of the ROM 11b, each ECU 10 operates as programmed to realize vehicle control including the engine control, ignition control and the like.

In this embodiment, the program stored in the ROM 11b of the microcomputer 11 of each ECU 10 is defined to realize distributed processing in the multiple ECUs 10 even in control of the engine and drive train. The distributed processing includes computation processing based on vehicle information from the sensors 30 connected to a certain ECU 10 being executed by a different ECU 10, and outputting of driving information for the actuator 40 connected to a certain ECU 10 being carried out by a different ECU 10.

Figure 3:
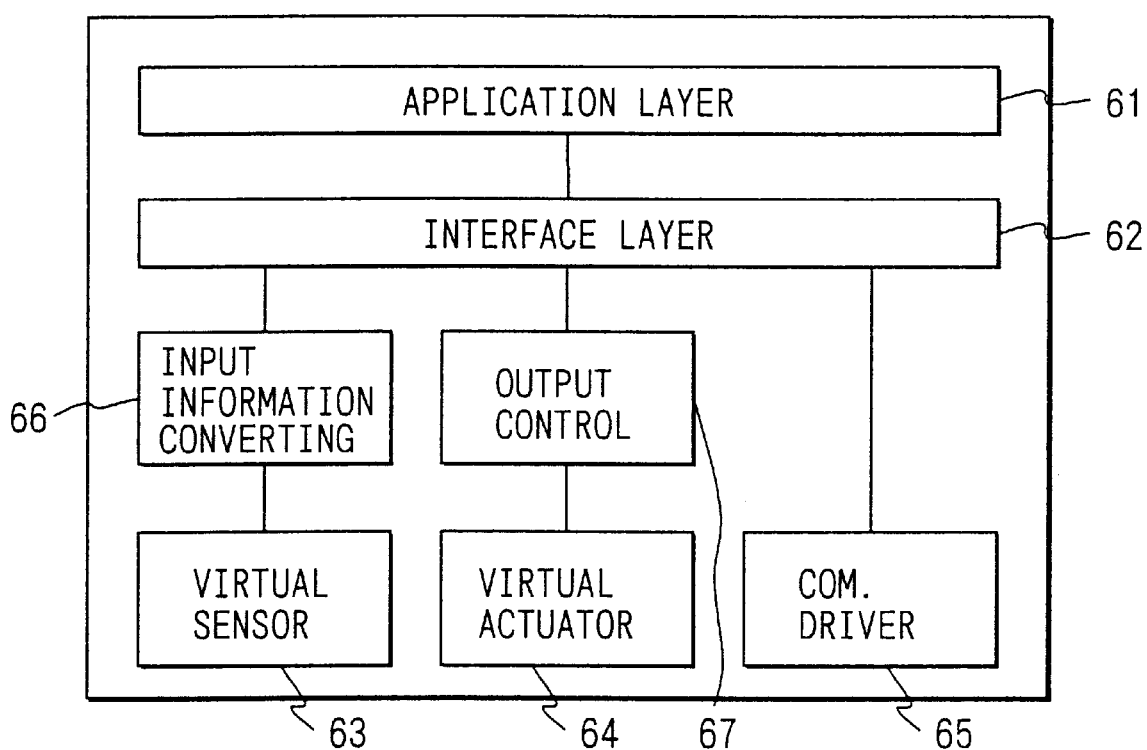
FIG. 3 is a block diagram showing a program construction of the ECU in the embodiment.

This program of each ECU 10 is defined as shown in FIG. 3. The programs loaded into the ECUs 10 are object-oriented type, and are made up of an application layer 61, an interface layer 62, a virtual sensor part 63, a virtual actuator part 64, a communication driver 65, an input information converting part 66, and an output control part 67. These program parts are made up of objects consisting of data and methods.

The application layer 61 is made up of multiple objects provided in function units. The application layer 61 executes computation processing based on vehicle information acquired by the sensors 30 and outputs driving information to the actuators 40 in accordance with results of the computation processing. This application layer 61 is an application program.

The virtual sensor part 63, the virtual actuator part 64 and the communication driver 65 are programs corresponding to hardware of the vehicle control apparatus 1, and respectively correspond to the sensors 30, the actuators 40 and the network construction connected by way of the communication line 50. The virtual sensor part 63 and the virtual actuator part 64 are constructed with objects provided in component units in correspondence with the sensors 30 and the actuators 40. For example, the virtual sensor part 63 is made up of a coolant temperature sensor object acquiring a signal from the coolant temperature sensor, an intake pipe pressure sensor object acquiring a signal from the intake pipe pressure sensor, and an oxygen concentration sensor object acquiring a signal from the oxygen concentration sensor. The the virtual actuator part 64 is made up of an igniter object for outputting a signal to an igniter and an injector object for outputting a signal to an injector. The virtual sensor part 63 and the virtual actuator part 64 are thus defined to function as a sensor/actuator layer.

The application layer 61 carries out computation processing on the basis of vehicle information that the objects of the virtual sensor part 63, and outputs driving information to the objects of the virtual actuator part 64. At this time, the application layer 61 can acquire vehicle information from the objects of the virtual sensor part 63 in another ECU 10 by the function of the communication driver 65, and can output driving information to the objects of the virtual actuator part 64 in another ECU 10 by the function of the communication driver 65. The interface layer 62 is provided for the application layer 61 to acquire vehicle information from an object of the virtual sensor part 63 in a desired ECU 10 and output driving information to an object of the virtual actuator part 64 in a desired ECU 10.

The interface layer 62 is also constructed with multiple objects provided in function units. This interface layer 62 manages the whereabouts of the objects of the virtual sensor parts 63 and the virtual actuator parts 64. The whereabouts of an object means information on which ECU 10 it is in. Accordingly, the application layer 61 does not need to know the whereabouts of objects at all. That is, by providing the interface layer 62, position transparency is realized. Because of this, the application layer 61, with respect to the interface layer 62, simply specifies an input destination object and requests the input of vehicle information and simply specifies an output destination object and requests the output of driving information.

More particularly, an object of the application layer 61 specifies an object of a virtual sensor part 30 or a virtual actuator part 64 and carries out a message output to the object of the interface layer 62, but to make the explanation simple hereinafter the description will be made like 'the application layer 61 specifies a virtual sensor part 63 or a virtual actuator part 64 and outputs a message to the interface layer 62', omitting the word object.

The program construction of this embodiment is characterized in that an input information converting part 66 is interposed between the interface layer 62 and the virtual sensor part 63 and an output control part 67 is interposed between the interface layer 62 and the virtual actuator part 64. The input information converting part 66 is constructed with objects in component units corresponding to the objects of the virtual sensor part 63. The output control part 67 also similarly is constructed with objects in component units corresponding to the objects of the virtual actuator part 64.

The input information converting part 66 converts to information directly processable in the application layer 61 and outputs vehicle information from the virtual sensor part 63. Directly processable means that conversion of the vehicle information to match the computation processing is not necessary.

For example, the application layer 61 carries out computation processing using throttle opening/closing information on which of fully closed, intermediate or fully open the throttle aperture is. At this time, as the sensor 30, a two-input sensor having a fully-closed switch and a fully-open switch of contacts type might be used. Alternatively, a sensor which detects the throttle opening angle linearly or in analog fashion might be used. Depending on differences between sensors 30 of this kind, the vehicle information outputted from the virtual sensor part 63 differs. However, the input information converting part 66 absorbs these differences and converts it to information which can be directly processed in the application layer 61, that is, throttle opening/closing information showing which of fully-closed, intermediate and fully-open it is.

Further, for example, the application layer 61 of this embodiment carries out computation processing using cranking information on starting of a starter motor (not shown). At this time, as the sensor 30, a sensor which directly detects a switch signal of a starter relay might be used. Alternatively, a sensor which detects a fall in the battery voltage might be used. This is because it can be indirectly detected that the starter relay has turned on for engine cranking even by detecting a fall in the battery voltage. Accordingly, when a fall in the battery voltage is detected as vehicle information, the input information converting part 66 generates cranking information as vehicle information.

On the other hand, the output control part 67 converts to information directly processable in the virtual actuator part 64 and outputs driving information acquired from the interface layer 62.

For example, the application layer 61 calculates the cooling ability of a radiator fan linearly or in analog fashion as a value of a predetermined range. At this time, as the radiator fan, a fan driven in the two stages of ON/OFF might be used. A fan driven in multiple stages such as strong, medium and weak might be used. Accordingly, the output control part 67, to match the radiator fan, converts to directly processable information and outputs the driving information.

The input information converting part 66 and the output control part 67 not only carry out the conversion processing of vehicle information and driving information but also function as follows.

That is, the input information converting part 66 acquires at suitable timing vehicle information from the sensors 30 acquired by the virtual sensor part 63, and outputs it to the interface layer 62. The output control part 67 acquires driving information transferred to the interface layer 62 and at suitable timing outputs it to the virtual actuator part 64. Thus, the input information converting part 66 and the output control part 67 operates as an information control layer.

This input timing or output timing adjustment function of the input information converting part 66 and the output control part 67 is described next with reference to the flow of the driving information and the vehicle information. First, the driving information transfer from the application layer 61 to the virtual actuator part 64 will be explained, and then the vehicle information transfer from the virtual sensor part 63 to the application layer 61 will be explained.

X : Driving Information Transfer

X-(1) First the application layer 61 outputs a message to the interface layer 62. This message includes a driving information output request and information specifying the virtual actuator part 64 that is the output destination.

X-(2) Then the interface layer 62 determines in which ECU 10 the output destination virtual actuator part 64 exists.

X-(2)-[1] Here if the output destination is the virtual actuator part 64 in the same ECU 10, the interface layer 62 acquires the driving information as it is.

X-(2)-[2] If the output destination is the virtual actuator part 64 in another ECU 10, the driving information is transferred through the communication line 50 to that other ECU 10 by means of the communication driver 65 Then, the interface layer 62 of that other ECU 10 acquires the driving information.

Figure 4:
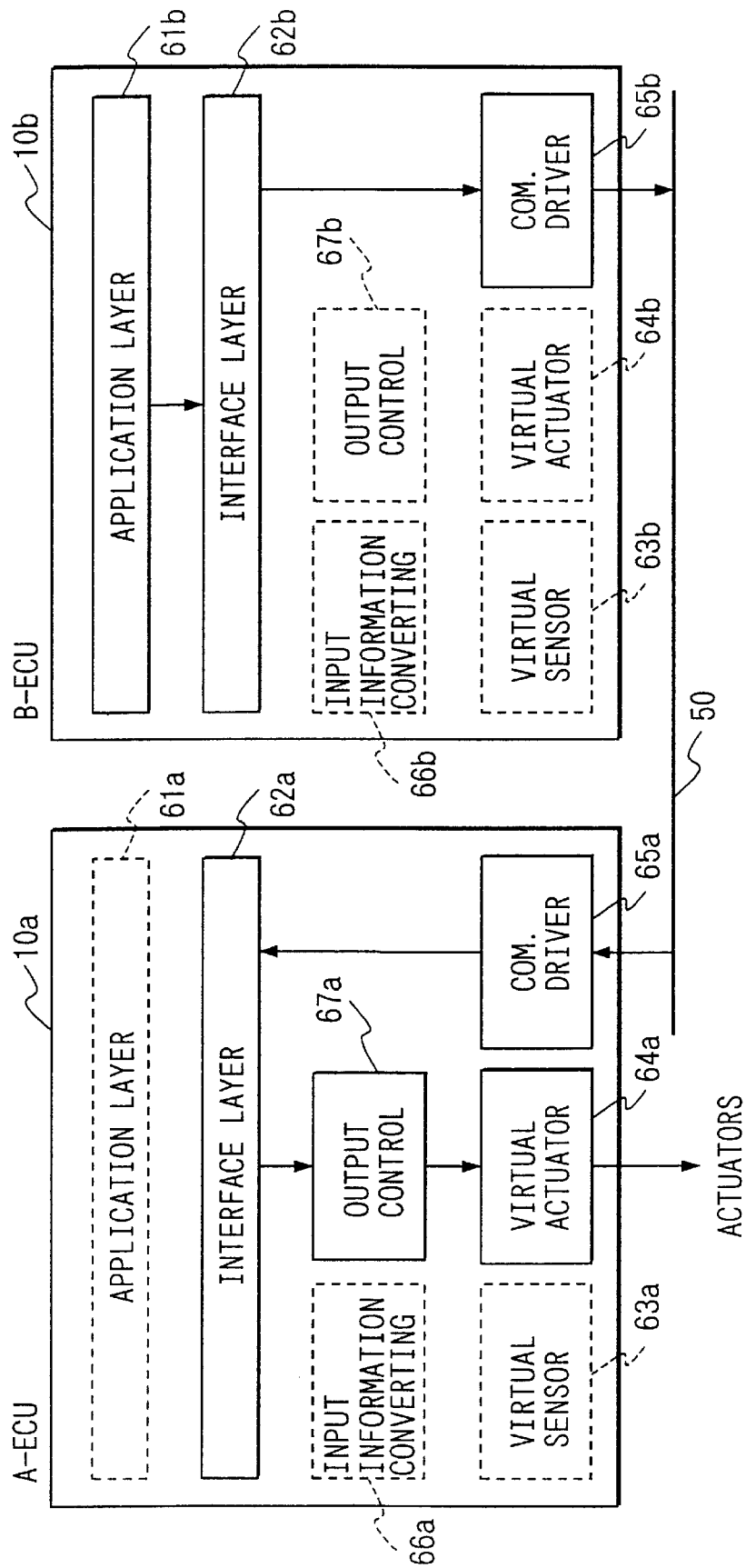
FIG. 4 is a block diagram showing a condition of a driving information transfer between the ECUs in the embodiment.

This process is shown in FIG. 4 which shows programs loaded into two ECUs (A-ECU and B-ECU) 10a and 10b. It is assumed that the application layer 61b of the B-ECU 10b has specified the virtual actuator part 64a of the A-ECU 10a as the transfer destination and outputted driving information to the interface layer 62b. Programs which do not function in this instance are shown with broken lines.

The interface layer 62b of the B-ECU 10B transfers the driving information to the A-ECU 10A via the communication driver 65b. Then, the interface layer 62a of the A-ECU 10a acquires the driving information via the communication driver 65a.

X-(3) In the case of X-(2)-[1], that is, when the interface layer 62 in the same ECU 10 acquires the driving information, the output control part 67 in the same ECU 10 extracts the driving information in the interface layer 62 and at suitable timing outputs it to the virtual actuator part 64. Then, the virtual actuator part 64 outputs that driving information to an actuator 40.

In the case of X-(2)-[2], that is, when the interface layer 62 in another ECU 10 acquires the driving information, the output control part 67 in that other ECU 10 extracts the driving information of the interface layer 62 and at suitable timing outputs it to the virtual actuator part 64. Then, the virtual actuator part 64 outputs that driving information to an actuator 40. In FIG. 4, the output control part 67a of the A-ECU 10a extracts and at suitable timing outputs to the virtual actuator part 64a the driving information acquired by the interface layer 62a of the A-ECU 10a. Thus in this case, an actuator 40 connected to the A-ECU 10a is driven by driving information from the application layer 61b of the B-ECU 10b.

Y: Vehicle Information Transfer

Y-(1) First the application layer 61 outputs a message to the interface layer 62. This message includes a vehicle information input request and information specifying an input destination virtual sensor part 63.

Y-(2) Then the interface layer 62 determines in which ECU 10 the input destination virtual sensor part 63 exists.

Y-(2)-[1] The input information converting part 66 at suitable timing extracts the vehicle information acquired by the virtual sensor part 63 and outputs it to the interface layer 62. Accordingly, if the input destination is the virtual sensor part 63 in the same ECU 10, the vehicle information outputted by the input information converting part 66 is acquired as it is and outputted to the application layer 61.

Figure 5:
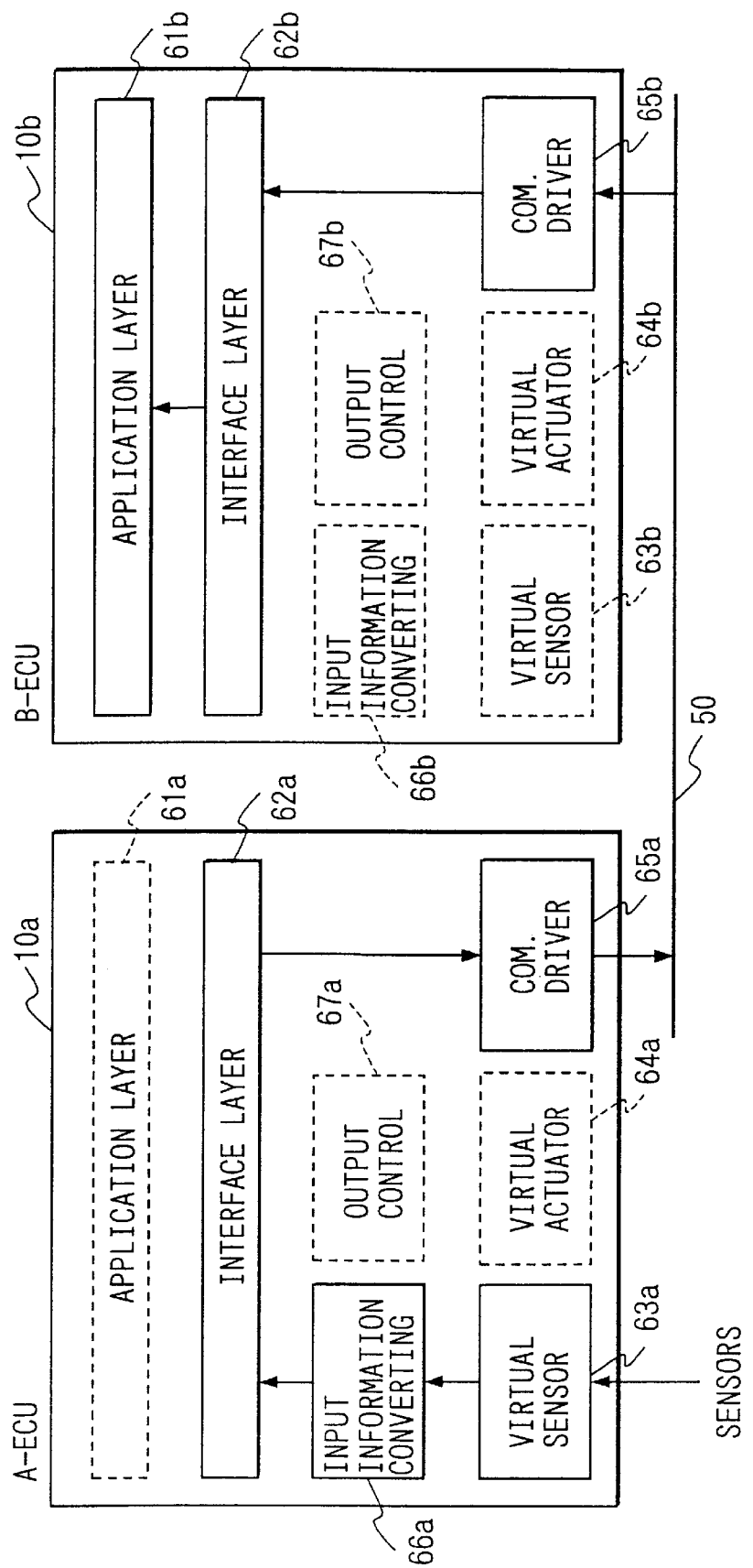
FIG. 5 is a block diagram showing a vehicle information transfer between the ECUs in the embodiment.

Y-(2)-[2] If the input destination is the virtual sensor part 63 in another ECU 10, a request for the vehicle information is made to that other ECU 10 via the communication line 50 by means of the communication driver 65. This process is shown in FIG. 5. In FIG. 5, programs loaded into A-ECU 10a and B-ECU 10b are shown. It is assumed that the application layer 61b of the B-ECU 10b has specified the virtual sensor part 63a of the A-ECU 10a as the input destination and made a request to the interface layer 62b for vehicle information. Here also, programs which do not function in this case are shown with broken lines.

The interface layer 62b of the B-ECU 10b makes a request for vehicle information to the A-ECU 10a via the communication driver 65b. In the A-ECU 10a, the input information converting part 66a at suitable timing acquires and outputs to the interface layer 62a vehicle information from a sensor 30 acquired by the virtual sensor part 63a. With respect to the above request, the interface layer 62a transfers the vehicle information outputted from the input information converting part 66a to the B-ECU 10b via the communication driver 65a. Thus the interface layer 62b of the B-ECU 10b acquires this vehicle information via the communication driver 65b and outputs it to the application layer 61b. In this case, on the basis of vehicle information from a sensor 30 connected to the A-ECU 10a, the application layer 61b of the B-ECU 10b executes computation processing.

According to the vehicle control apparatus 1 of this embodiment, it is possible to realize distributed processing even in control of the engine and drive train. This will be explained with a specific example.

Figure 6A:
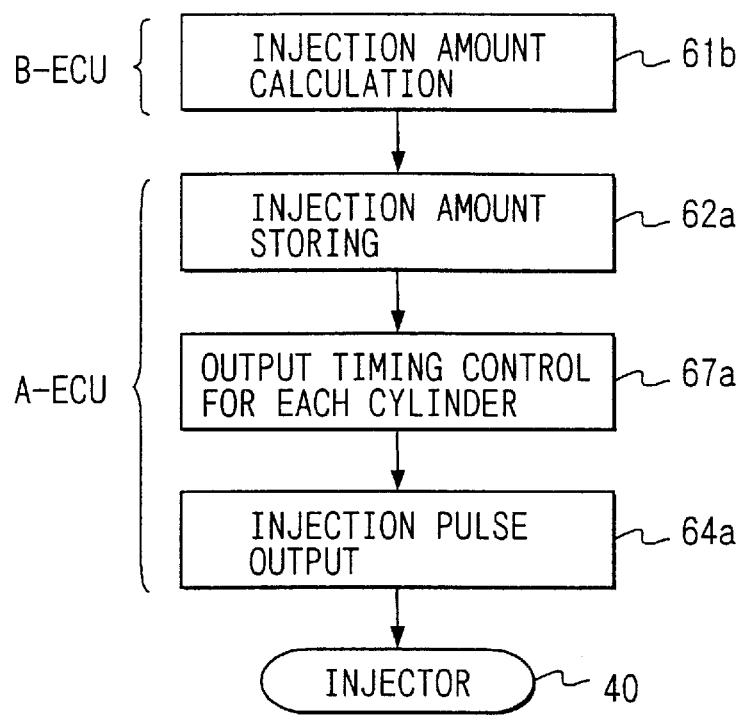
FIGS. 6A and 6B are schematic diagrams showing the driving information transfer between the ECUs in case of driving an injector and showing the vehicle information transfer between the ECUs in case of detecting an average intake pipe pressure, respectively.

For example in FIG. 4, it is assumed that a fuel injection amount is calculated by the B-ECU 10b and an injector constituting the actuator 40 connected to the A-ECU 10a is controlled. In this case, as shown in FIG. 6A, fuel injection amount calculation is carried out by the application layer 61b of the B-ECU 10b, and the calculated injection amount constituting driving information is transferred to the interface layer 62a of the A-ECU 10a via the communication line 50. Then, the output control part 67a of the A-ECU 10a extracts the injection amount transferred to the interface layer 62a and outputs an injection command to the virtual actuator part 64a at output timing for each cylinder. On the basis of this the virtual actuator part 64a outputs an injection pulse to the injector.

Accordingly, if the injection amount is transferred in advance at appropriate timing from the application layer 61b of the B-ECU 10b to the interface layer 62a of the A-ECU 10a, after that, by the output control part 67a, injection commands to the virtual actuator part 64a are carried out at suitable timing. That is, even if a delay occurs in the transfer of the calculated injection amount from the B-ECU 10b to the A-ECU 10a, the output timing is optimized by the output control part 67a of the A-ECU 10a. For example, in a system in which injection pulses should be outputted at times t1, t2, t3, . . . , if it is made so that the injection amount from the application layer 61b of the B-ECU 10b is acquired by the interface layer 62a of the A-ECU 10a before the respective time t1, t2, t3, . . . , after that the output control part 67a outputs the injection command at the time t1, t2, t3, at which it should be outputted.

However, it may be impossible for the injection amount to be transferred to the interface layer 62a of the A-ECU 10a at appropriate timing. Because there are cases where the application layer 61b of the B-ECU 10b can only output the information on injection amount that should be outputted at the time t1, t2, t3, . . . , just before the respective times t1, t2, t3, . . . However, in this case, the output control part 67a of the A-ECU 10a can be made to carry out injection commands based on the injection amount of one cycle before, so that it carries out at the time t2 the injection command that should have been outputted at the time t1, and carries out at the time t3 the injection command that should have been carried out at the time t2. Because the important thing in injection control is the timing of the injection command. It may occur that the injection command is outputted at time t1' (<t2) deviating from the time t1 at which it should have been outputted. It is fatal to the system even if the injection command based on the injection amount that should have been outputted one cycle earlier is carried out. If the injection timing is suitable, it does not become a problem.

Thus with the program construction of this embodiment, even in engine and drive train control, which requires relatively high real-time operation, the output timing of driving information can be made suitable and distributed processing among multiple ECUs 10 can be made possible.

Figure 6B:
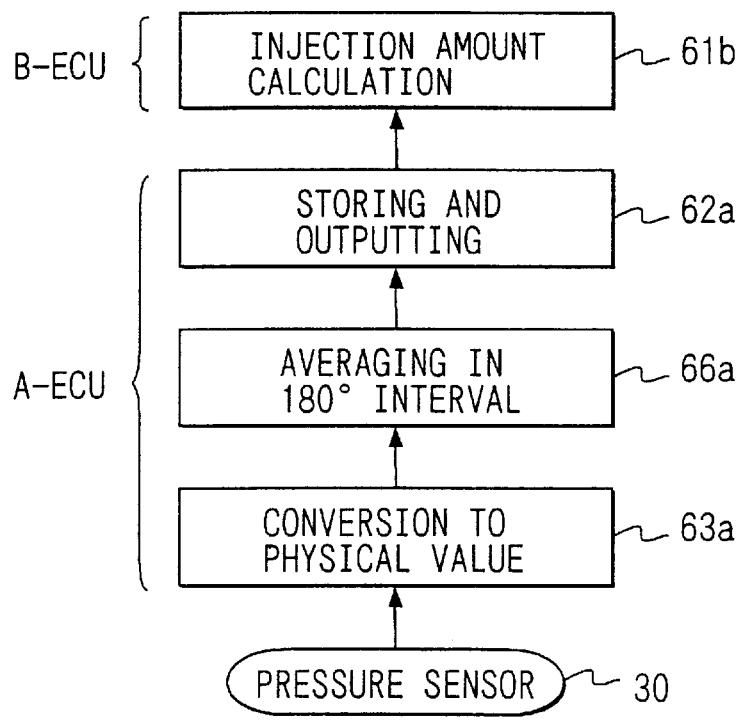
Figure 7:
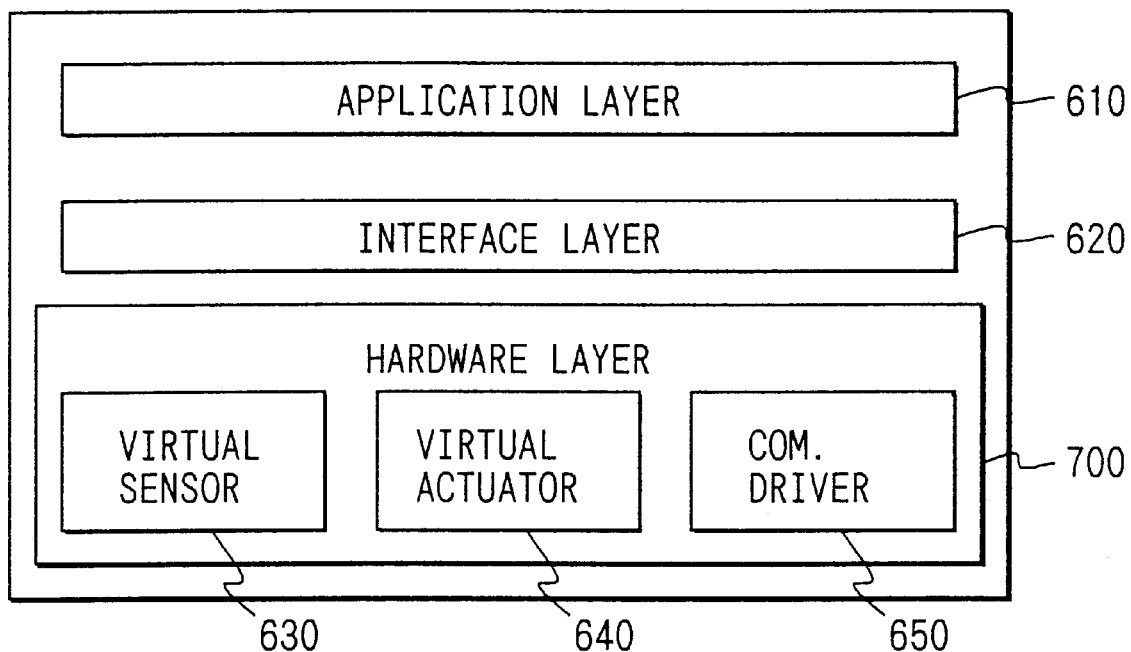
FIG. 7 is a block diagram showing a program construction of each ECU in a vehicle control apparatus according to a related art.
Figure 8:
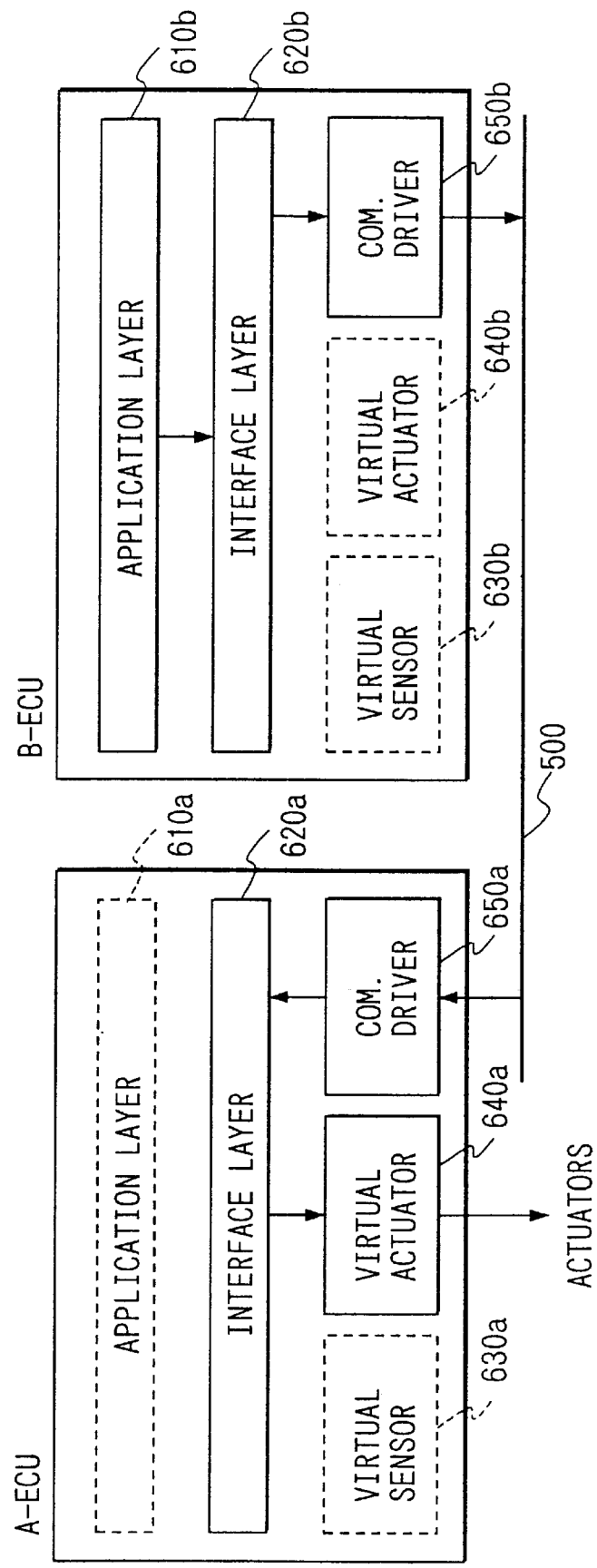
FIG. 8 is a block diagram showing a driving information transfer between ECUs in the related art.

It is assumed in FIG. 5 that the computation processing is executed by the B-ECU 10b on the basis of the vehicle information from an intake pipe pressure sensor constituting the sensor 30 connected to the A-ECU 10a. In this case, as shown in FIG. 6B, on the basis of a request from the application layer 61b of the B-ECU 10b, the interface layer 62a of the A-ECU 10a transfers an average intake pipe pressure via the communication line 50.

In the A-ECU 10a, the virtual sensor part 63a converts a voltage value from the intake pipe pressure sensor into a physical value and calculates an intake pipe pressure. The input information converting part 66a acquires (samples) this intake pipe pressure from the virtual sensor part 63a at timing of every 1 ms, and outputs an averaged intake pipe pressure as vehicle information every time the crankshaft rotates through 180°. Thus, the application layer 61b of the B-ECU 10b need only request the acquisition of the intake pipe pressure at relatively long time intervals of 180° of crankshaft of the engine rotation and acquire an averaged intake pipe pressure outputted to the interface layer 62a.

In the past, it was not possible for the application layer 61b of the B-ECU 10b to sample from the virtual sensor part 63a of the A-ECU 10a the intake pipe pressure with a relatively short period, because of communication delay. In this embodiment, however, the input information converting part 66a samples the intake pipe pressure calculated by the virtual sensor part 63a in the relatively short period of 1 ms.

As a result, even in engine and drive train control, which requires relatively high real-time operation, vehicle information input timing can be made suitable and distributed processing among multiple ECUs 10 can be realized.

Further, according to the vehicle control apparatus 1 of this embodiment, the objects dependent on the sensors 30 and the actuators 40 are separated as the virtual sensor part 63 and the virtual actuator part 64. Therefore, even if the sensors 30 or the actuators 40 are changed, the reusability of the application layer 61, that is, the application program, is ensured.

Moreover, the input information converting part 66 converts to information directly processable in the application layer 61 and outputs vehicle information from the virtual sensor part 63. The output control part 67 converts to information directly processable in the virtual actuator part 64 and outputs driving information acquired from the interface layer 62. That is, the input information converting part 66 executes conversion processing of vehicle information matched to the computation processing of the application layer 61. The output control part 67 executes conversion processing of driving information matched to the actuators 40. Because no change to the application layer 61 is necessary even if the sensors 30 or the actuators 40 change with vehicle type or grade, further improvement of the reusability of the application program is achieved.

Furthermore, in the vehicle control apparatus 1 of this embodiment, the vehicle control programs are object-oriented designed, and the application layer 61 and the interface layer 62 are constructed with objects in function units. Further, the virtual sensor part 63b, the input information converting part 66b and the virtual actuator part 64, the output control part 67 are constructed with objects in component units. Thus, for example in a system wherein the specifications of an injector constituting an actuator 40 differs, only the object relating to this injector need be changed, and the other injectors can be used as they are. Accordingly, the reusability of not only application programs but vehicle control programs is ensured.

The present invention should not be limited to the disclosed embodiment, but may be implemented in many other ways without departing from the spirit of the invention.

What is claimed is:

1. A vehicle control apparatus comprising:

detecting means for detecting vehicle information;

driving means for driving a vehicle;

multiple processing executing units for carrying out computation processing based on the vehicle information and outputting driving information to the driving means in accordance with results of the computation processing, wherein the processing executing units are loaded with vehicle control programs distributedly; and communication means connecting the processing executing units, wherein the vehicle control programs include an application layer for executing the computation processing, a sensor/actuator layer for executing processing dependent on the detecting means and the driving means and carrying out acquisition of the vehicle information and outputting of the driving information, an interface layer for acquiring and sending to another processing executing unit via the communication means the driving information from the application layer, and also acquiring the driving information sent from the another processing executing unit, and an information control layer for outputting to the sensor/actuator layer at suitable timing the driving information acquired by the interface layer.

2. The vehicle control apparatus as in claim 1, wherein:

the application layer outputs the driving information in a fixed form; and the information control layer converts to information directly processable by the sensor/actuator layer and outputs the driving information.

3. A vehicle control apparatus comprising:

detecting means for detecting vehicle information;

driving means for driving a vehicle;

multiple processing executing units for carrying out computation processing based on the vehicle information and outputting driving information to the driving means in accordance with results of the computation processing, wherein the processing executing units are loaded with vehicle control programs distributedly; and communication means connecting the processing executing units, wherein the vehicle control programs include an application layer for executing the computation processing, a sensor/actuator layer for executing processing dependent on the detecting means and the driving means and carrying out acquisition of the vehicle information and outputting of the driving information, an information control layer for at suitable timing acquiring and outputting the vehicle information acquired by the sensor/actuator layer, and an interface layer for acquiring and outputting to the application layer the vehicle information outputted from the information control layer on the basis of a request from the application layer, making a request for the vehicle information to another processing executing unit via the communication means, acquiring and outputting to the application layer the vehicle information sent with respect to this request, and sending the vehicle information from the information control layer when a request is made for the vehicle information from another processing executing unit.

4. The vehicle control apparatus as in claim 3, wherein:

the sensor/actuator layer outputs the vehicle information in a form corresponding to the detecting means; and the information control layer converts to information directly processable by the application layer and outputs the vehicle information.

5. The vehicle control apparatus as in claim 1, wherein:

the information control layer at suitable timing acquires and outputs the vehicle information acquired by the sensor/actuator layer; and the interface layer acquires and outputs to the application layer the vehicle information outputted from the information control layer on the basis of a request from the application layer, makes a request for the vehicle information to another processing executing unit via the communication means, acquires and outputs to the application layer the vehicle information sent with respect to this request, and sends the vehicle information from the information control layer when a request is made for the vehicle information from another processing executing unit.

6. The vehicle control apparatus as in claim 5, wherein:.

the sensor/actuator layer outputs the vehicle information in a form corresponding to the detecting means, and the information control layer converts to information directly processable by the application layer and outputs the vehicle information.

7. The vehicle control apparatus as in claim 1, wherein:

the application layer, the interface layer, the information control layer and the sensor/actuator layer are made up of multiple objects provided in component units or function units.

8. A computer-readable recording medium on which is recorded a vehicle control program loaded into the vehicle control apparatus as set forth in claim 1.

9. The vehicle control apparatus as in claim 3, wherein:

the application layer, the interface layer, the information control layer and the sensor/actuator layer are made up of multiple objects provided in component units or function units.

10. A computer-readable recording medium on which is recorded a vehicle control program loaded into the vehicle control apparatus as set forth in claim 3.

\* \* \* \* \*